J. L. McLAUGHLIN.
PAIL.
APPLICATION FILED OCT. 14, 1912.
1,050,156.
Patented Jan. 14, 1913.
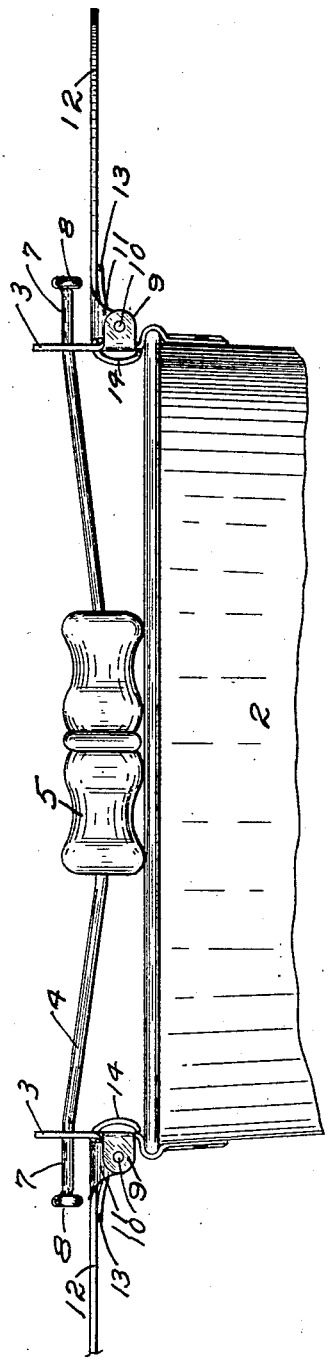
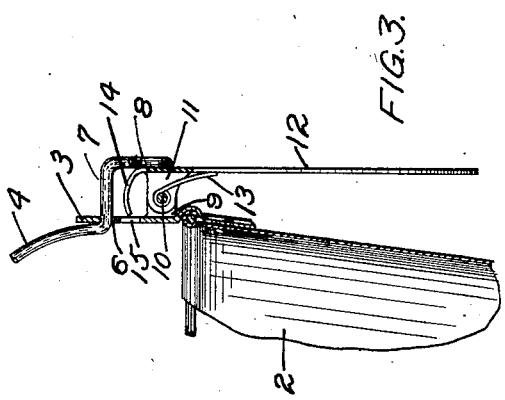
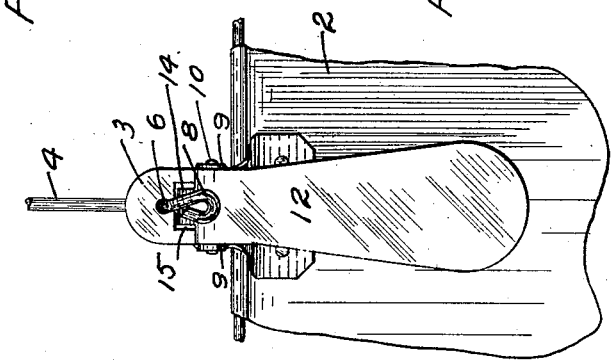
WITNESSES
H. E. Lambert
N. E. Sorensen
INVENTOR
JOHN L. McLAUGHLIN.
BY Paul & Paul
ATTORNEYS.

UNITED STATES PATENT OFFICE.

JOHN L. McLAUGHLIN, OF WARREN, ILLINOIS.

PAIL.

1,050,156.

Specification of Letters Patent.   Patented Jan. 14, 1913.

Application filed October 14, 1912.   Serial No. 725,617.

*To all whom it may concern:*

Be it known that I, JOHN L. McLAUGHLIN, of Warren, Jo Daviess county, Illinois, have invented certain new and useful Improvements in Pails, of which the following is a specification.

My invention relates to pails adapted particularly for use as milk pails and the object of the invention is to provide means for supporting the pail between the legs and thereby avoid the necessity of placing the pail on the floor or ground or attempting to hold it by pressure of the legs on the walls of the pail.

A further object is to provide a pail having supporting arms which will automatically assume a horizontal position when the bail is released and drops down upon the pail wall, the arms being forced down to a vertical, inoperative position when the bail is raised from either side.

The invention consists generally in various constructions and combinations, all as hereinafter described and particularly pointed out in the claims.

In the accompanying drawings forming part of this specification, Figure 1 is a detail view of the upper portion of a pail, showing my invention applied thereto, Fig. 2 is a side view, illustrating one of the supporting arms in its vertical or inoperative position, Fig. 3 is a detail sectional view, showing the preferred manner of mounting an arm on the bail.

In the drawing, 2 represents a pail of ordinary construction, having ears 3 secured thereto and a bail 4 provided with a hand grip 5. The ears extend preferably for a considerable distance above the top of the pail and are provided at their upper ends with holes 6 to receive horizontal extensions 7 of the ends of the bail. These extensions terminate preferably in downwardly turned looped ends 8. The middle portions of the ears are preferably provided with outwardly projecting lugs 9 in which pins 10 are mounted, forming bearings for ears 11 provided on arms 12. These ears are preferably made of sheet metal and preferably increase in width toward their outer ends to form substantial supports to rest upon the knees or legs of the user of the pail. The arms are capable of swinging from a vertical position parallel substantially with the walls of the pail to a horizontal position at right angles thereto, and I prefer to provide a spring 13 on the pin 12 and tensioned to normally hold each arm in its horizontal position. The inner end of each arm is preferably provided with a curved tongue 14 that is adapted to enter a slot 15 in the upper portion of the ear, this tongue serving as a guide for the arm and its end contacting with the inner surface of the ear and limiting the upward movement of the arm, as indicated in Fig. 1.

In the operation of the device, the bail is dropped upon the top of the pail, as shown in Fig. 1, and the springs 13 will swing the arms upward to a horizontal position, where they can be placed upon the knees or legs of the person milking and will form a substantial support for the pail without requiring any pressure of the legs on the walls of the pail to hold it in place. When the bail is lifted from either side, the looped ends 8 will contact with the arms between their pivots and their outer ends and the pressure of the looped ends on the arms will cause them to swing down to the position shown in Fig. 3, where they will be held as long as the bail is in its raised or carrying position.

In various ways the details of construction as herein shown and described, such as the manner of mounting the arms, may be modified and still be within the scope of my invention.

I claim as my invention:—

1. The combination, with a pail, of arms hinged on the upper portion thereof, means for normally holding said arms in a horizontal position, and a carrying bail for said pail having means when the bail is raised from either side of the pail to engage and force said arms downwardly to a substantially vertical position.

2. The combination, with a pail and ears secured to the walls thereof, and a carrying bail journaled in said ears and having outwardly projecting portions, of arms pivoted on said ears, springs normally holding said arms in their raised horizontal position, the outwardly projecting portions of said bail engaging said arms to force them down against the wall of the pail when the bail is raised.

3. The combination, with a pail, of arms pivotally supported thereon and a bail having means for engaging and actuating said arms when said bail is lifted from either side of the pail.

4. The combination, with a pail, of ears mounted thereon and having outwardly projecting lugs, spring-pressed arms pivotally supported between said lugs, a bail journaled in said ears above said lugs and having outwardly projecting portions terminating in downwardly extending ends, said downwardly extending ends engaging said arms to actuate the same when said bail is lifted.

5. The combination, with a pail, of ears mounted thereon and provided with outwardly projecting lugs, spring-pressed arms pivotally supported between said lugs, said ears having slots above said lugs to receive inwardly projecting tongues provided on said arms, the ends of said tongues forming stops to limit the upward movement of said arms, and a carrying bail having means to engage and actuate said arms.

6. The combination, with a pail, of ears mounted thereon, arms pivoted on said ears, springs for normally holding said arms in a raised horizontal position, a carrying bail mounted in said ears and having downwardly turned ends adapted to engage said arms and force them downwardly against the walls of the pail when said bail is raised.

In witness whereof, I have hereunto set my hand this 9th day of October, 1912.

JOHN L. McLAUGHLIN.

Witnesses:
W. C. P. FORREST,
JOHN J. FLANAGAN.

---

Copies of this patent may be obtained for five cents each, by addressing the "Commissioner of Patents, Washington, D. C."